(12) United States Patent
Yamada

(10) Patent No.: US 11,032,880 B2
(45) Date of Patent: Jun. 8, 2021

(54) LIGHT EMISSION CONTROL DEVICE, LIGHT SOURCE DEVICE, AND PROJECTION-TYPE VIDEO DISPLAY APPARATUS

(71) Applicant: SEIKO EPSON CORPORATION, Tokyo (JP)

(72) Inventor: Atsushi Yamada, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/825,216

(22) Filed: Mar. 20, 2020

(65) Prior Publication Data
US 2020/0305245 A1 Sep. 24, 2020

(30) Foreign Application Priority Data
Mar. 22, 2019 (JP) .............................. JP2019-054048

(51) Int. Cl.
| H05B 41/392 | (2006.01) |
| G03B 21/20 | (2006.01) |
| H05B 41/04 | (2006.01) |
| H05B 47/14 | (2020.01) |
| H05B 47/16 | (2020.01) |
| H04N 9/31 | (2006.01) |

(52) U.S. Cl.
CPC ....... *H05B 41/3927* (2013.01); *G03B 21/206* (2013.01); *G03B 21/2053* (2013.01); *H04N 9/3155* (2013.01); *H05B 41/042* (2013.01); *H05B 47/14* (2020.01); *H05B 47/16* (2020.01)

(58) Field of Classification Search
CPC .. H05B 41/042; H05B 41/3927; H05B 47/14; H05B 47/16; G03B 21/206; G03B 21/2053; H04N 9/3155
See application file for complete search history.

(56) References Cited

U.S. PATENT DOCUMENTS

| 2007/0164687 A1* | 7/2007 | Watanabe | ............ H04N 9/3114 |
| | | | 315/291 |
| 2007/0285071 A1* | 12/2007 | Su | ........................... G05F 1/575 |
| | | | 323/282 |
| 2010/0067270 A1* | 3/2010 | Odell | .................... H02M 3/156 |
| | | | 363/89 |
| 2012/0313917 A1* | 12/2012 | Yamada | ............. H05B 45/3725 |
| | | | 345/211 |

(Continued)

FOREIGN PATENT DOCUMENTS

| JP | 2008-154052 A | 7/2008 |
| JP | 2014-514912 A | 6/2014 |

*Primary Examiner* — Amy Cohen Johnson
*Assistant Examiner* — Syed M Kaiser
(74) *Attorney, Agent, or Firm* — Oliff PLC

(57) ABSTRACT

A light emission control device includes a power source circuit for a drive circuit that supplies a power for a drive circuit based on an input power, a power source circuit for a control circuit that supplies a power for a control circuit based on the input power, a control circuit, a drive circuit, and a start control circuit. The control circuit outputs a control signal for controlling turning on/off of a switching element. The drive circuit outputs a drive signal for driving the switching element based on the control signal. The start control circuit outputs a start control signal for delaying a timing at which the output of the drive signal is started after the input power is turned on.

12 Claims, 12 Drawing Sheets

(56) References Cited

U.S. PATENT DOCUMENTS

| | | | |
|---|---|---|---|
| 2013/0038233 A1* | 2/2013 | Chu | H05B 45/46 |
| | | | 315/224 |
| 2014/0125240 A1 | 5/2014 | Bordin et al. | |
| 2014/0365792 A1* | 12/2014 | Yun | H02J 7/00047 |
| | | | 713/320 |
| 2015/0002016 A1* | 1/2015 | Cai | H05B 47/20 |
| | | | 315/86 |
| 2016/0291682 A1* | 10/2016 | Herfurth | H05B 45/00 |
| 2018/0180978 A1 | 6/2018 | Yamada et al. | |
| 2018/0267395 A1* | 9/2018 | Yamada | H05B 45/37 |

\* cited by examiner

LIGHT EMISSION CONTROL DEVICE, LIGHT SOURCE DEVICE, AND PROJECTION-TYPE VIDEO DISPLAY APPARATUS

The present application is based on, and claims priority from JP Application Serial Number 2019-054048, filed Mar. 22, 2019, the disclosure of which is hereby incorporated by reference herein in its entirety.

BACKGROUND

1. Technical Field

The present disclosure relates to a light emission control device, a light source device, a projection-type video display apparatus, and the like.

2. Related Art

A light emission control device that controls a light source used in a projector or the like is known. The light emission control device causes a light emission element to emit light by causing a constant current to flow through the light emission element. A switching element is provided in a current path of the constant current, and the light emission control device turns on and off the constant current by turning on and off the switching element by a PWM signal. In this case, a light emission amount is modulated by an on-duty of the switching element. The related art of such a light emission control device is disclosed, for example, in JP-A-2008-154052.

JP-A-2008-154052 discloses a load drive circuit including a MOSFET coupled in series between a DC stabilized power source and a load, and a sub-constant current source provided between a source and a ground of the MOSFET. The load is an LED and a main constant current source, and the LED emits light when a current flows through a path of the DC stabilized power source, the MOSFET, the LED, and the main constant current source. The load drive circuit turns on and off the current by turning on or off the MOSFET, and performs dimming by an on-duty. In this case, prior to application of an output voltage to the load by the DC stabilized power source, the load drive circuit couples the sub constant current source to the DC stabilized power source. This makes it possible to apply a stable power source voltage to the load.

When a power is turned on for the light emission control device, a drive signal for driving the switching element becomes unstable, and unfortunately, an overcurrent may flow through the light emission element via the switching element. In JP-A-2008-154052 described above, although the overcurrent is reduced by causing a current to flow from the sub-constant current source, the sub-constant current source is required as an external circuit of the light emission control device. That is, there is a problem that it is needed to prevent the overcurrent and reduce the number of external parts of the light emission control device.

SUMMARY

An aspect of the present disclosure relates to a light emission control device for controlling a switching element of a light source circuit, the light source circuit including a resistor, a light emission element, the switching element, and an inductor provided in series between a first power node and a second power node, the device including: a power source circuit for a drive circuit that supplies a power for a drive circuit based on an input power; a power source circuit for a control circuit that supplies a power for a control circuit based on the input power; a control circuit that is operated by the power for a control circuit and outputs a control signal for controlling turning on/off of the switching element; a drive circuit that is operated by the power for a drive circuit and outputs a drive signal for driving the switching element based on the control signal; and a start control circuit. The start control circuit outputs a start control signal for delaying a timing at which an output of the drive signal is started after the input power is turned on.

DESCRIPTION OF EXEMPLARY EMBODIMENTS

Hereinafter, preferred embodiments of the present disclosure will be described in detail. In addition, the present embodiments described below do not unduly limit the contents described in the aspects, and all the configurations described in the present embodiments are not necessarily essential constituent elements.

1. Configuration of First Embodiment

Figure 1:
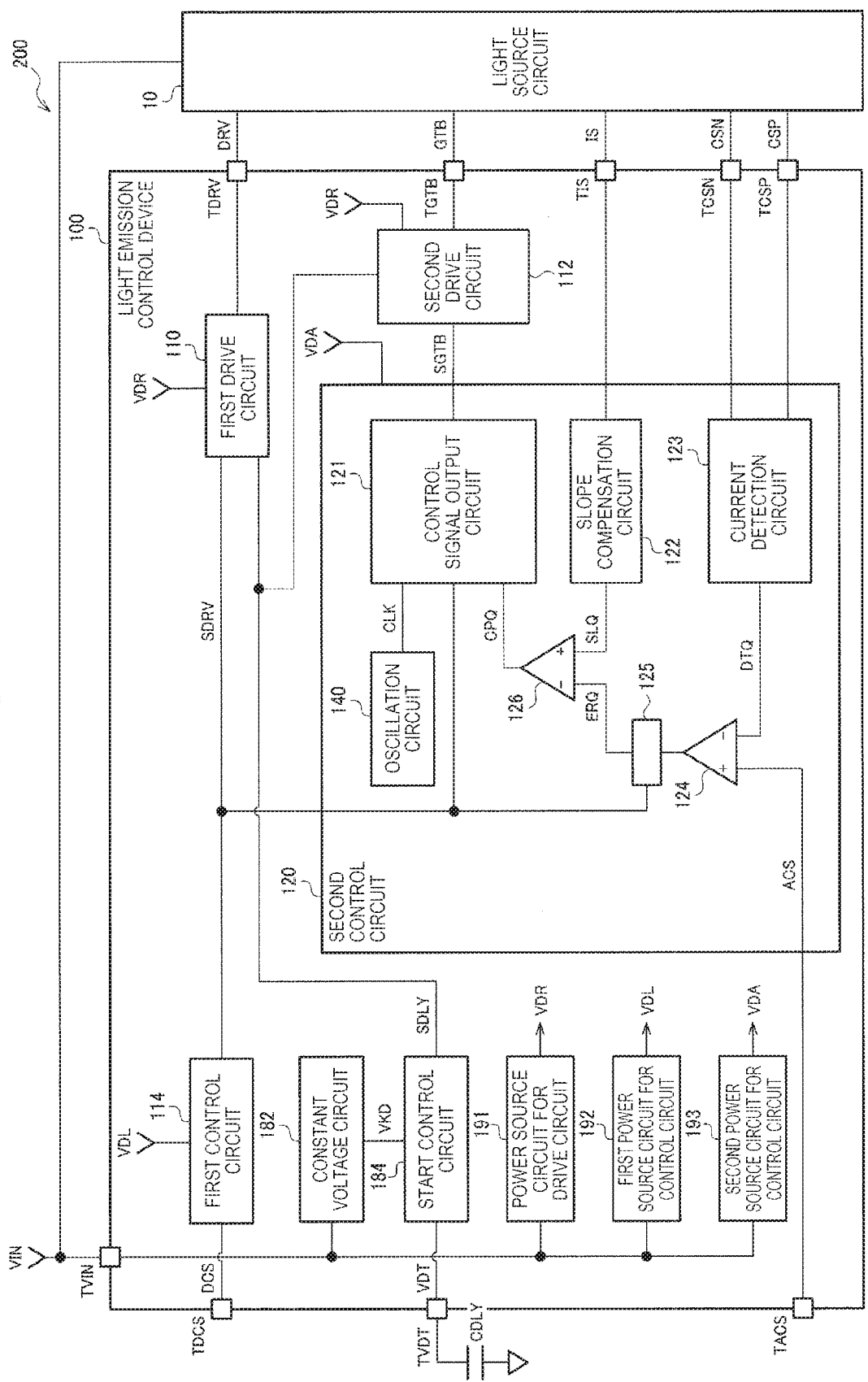
FIG. 1 is a configuration example of a light source circuit.
Figure 2:
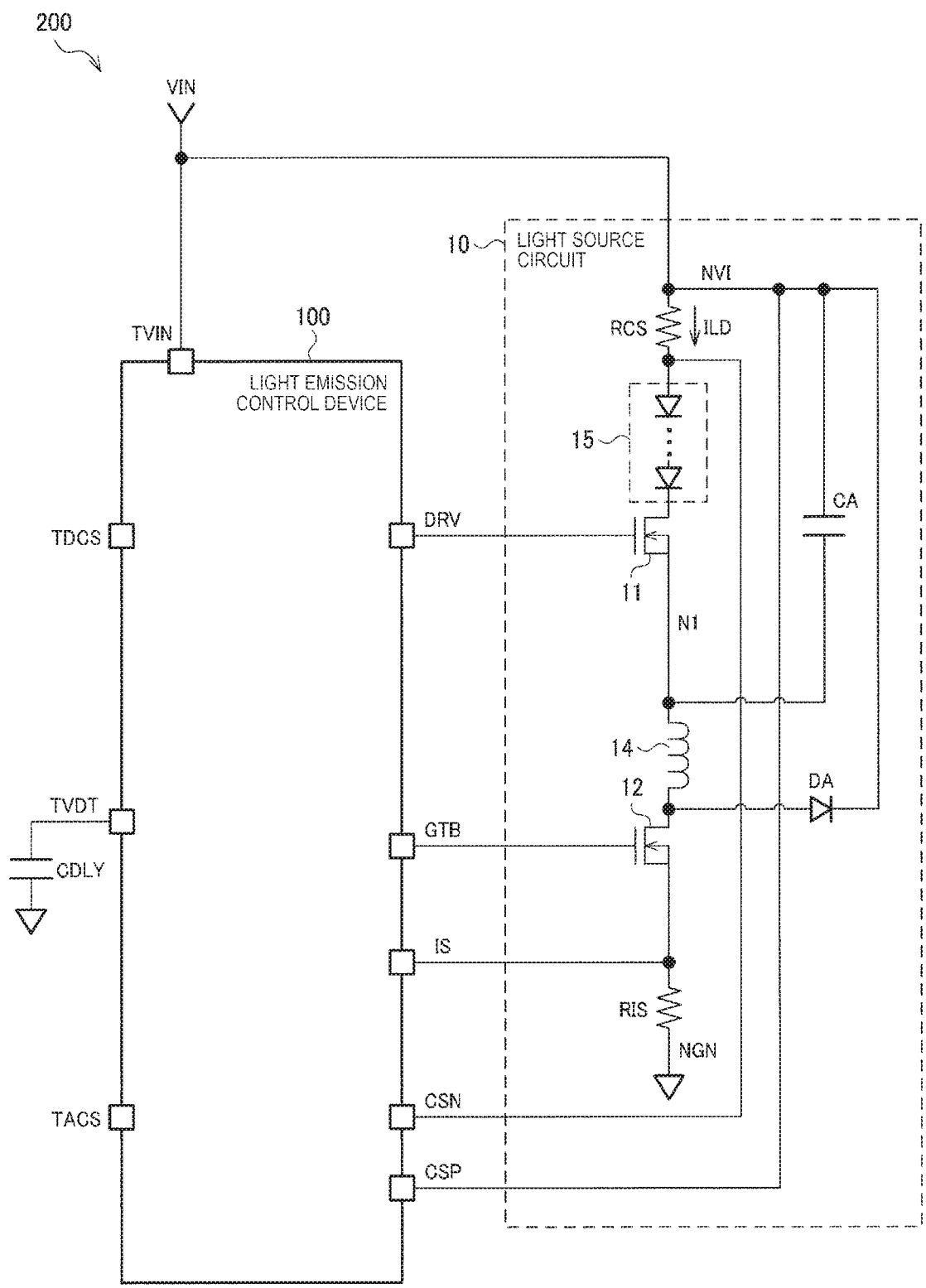
FIG. 2 is a configuration example of a light emission control device in a first embodiment.

FIGS. 1 and 2 are configuration examples of a light source device 200. The light source device 200 includes a light source circuit 10 that is a light emission element and a peripheral circuit thereof, and a light emission control device 100 that controls light emission of the light emission element. The light emission control device 100 is, for example, an integrated circuit device, and is realized by, for example, a semiconductor chip.

First, the configuration of the light source circuit 10 will be described with reference to FIG. 2, the configuration of the light emission control device 100 in a first embodiment will be described with reference to FIG. 1, and a PWM dimming mode and an analog dimming mode will be described with reference to FIGS. 3 and 4. Thereafter, a method of the first embodiment for preventing an overcurrent when a power is turned on will be described with reference to FIG. 5 and subsequent figures.

As illustrated in FIG. 2, the light source circuit 10 includes a first switching element 11, a second switching element 12, an inductor 14, and a light emission element 15. The light source circuit 10 includes a first resistor RCS, a second resistor RIS, a capacitor CA, and a diode DA. The first switching element 11 and the second switching element 12 are, for example, N-type transistors.

The light emission element 15 is driven by a current ILD, and emits light with brightness according to a current value of the current ILD. The light emission element 15 is a plurality of laser diodes coupled in series with each other. However, the light emission element 15 may be a single laser diode or a light emitting diode (LED).

The light emission element 15 and the first switching element 11 are provided in series between a first power node NVI and a first node N1. The first node N1 is a node coupled to one end of the inductor 14. The inductor 14, the second switching element 12, and the second resistor RIS are provided in series between the first node N1 and a second power node NGN.

Specifically, the first resistor RCS is coupled between the first power node NVI and one end of the light emission element 15, the other end of the light emission element 15 is coupled to a drain of the first switching element 11, and a source of the first switching element 11 is coupled to one end of the inductor 14. The other end of the inductor 14 is coupled to a drain of the second switching element 12, and the second resistor RIS is coupled between a source of the second switching element 12 and the second power node NGN. A coupling relationship of the capacitor CA and the diode DA is as illustrated in FIG. 2, and an operation of the light source circuit 10 including these circuit elements will be described later with reference to FIGS. 3 and 4.

The first power node NVI is a node to which a first power is input. Hereinafter, the first power is referred to as an input power VIN. The second power node NGN is a node to which a second power is input. A voltage of the first power is higher than a voltage of the second power. The second power is, for example, a ground.

The second switching element 12 performs switching regulation control on a current flowing through the inductor 14. The first switching element 11 controls whether or not the current flowing through the inductor 14 flows through the light emission element 15. Although details will be described later, a mode, in which the first switching element 11 is always turned on and a light emission amount of the light emission element 15 is controlled by the switching regulation control of the second switching element 12, is referred to as an analog dimming mode. Further, a mode, in which the light emission amount of the light emission element 15 is controlled by an on-duty when the first switching element 11 is turned on and off, is referred to as a PWM dimming mode.

As shown in FIG. 1, the light emission control device 100 includes a first drive circuit 110, a second drive circuit 112, a first control circuit 114, a second control circuit 120, a constant voltage circuit 182, a start control circuit 184, a power source circuit 191 for a drive circuit, a first power source circuit 192 for a control circuit, and a second power source circuit 193 for a control circuit. Further, the light emission control device 100 includes a PWM terminal TDCS, a dimming voltage input terminal TACS, a power terminal TVIN, a capacitor terminal TVDT, and terminals TDRV, TGTB, TIS, TCSP, and TCSN.

The input power VIN is input to the power terminal TVIN from a power source circuit provided outside the light emission control device 100. The power source circuit 191 for a drive circuit converts a voltage of the input power VIN to a voltage of a power VDR for a drive circuit, and supplies the power VDR for a drive circuit to the first drive circuit 110 and the second drive circuit 112. The first power source circuit 192 for a control circuit converts the voltage of the input power VIN to a voltage of a first power VDL for a control circuit, and supplies the first power VDL for a control circuit to the first control circuit 114. The second power source circuit 193 for a control circuit converts the voltage of the input power VIN to a voltage of a second power VDA for a control circuit, and supplies the second power VDA for a control circuit to the second control circuit 120. Each of the power source circuit 191 for a drive circuit, the first power source circuit 192 for a control circuit, and the second power source circuit 193 for a control circuit is a regulator, for example, a linear regulator using a forward rotation amplifier circuit. In the following description, the power VDR, the power VDL, and the power VDA are described in short.

A PWM signal DCS used for dimming control in the PWM dimming mode is input from a processing device to the PWM terminal TDCS. A dimming voltage ACS used for dimming control in the analog dimming mode is input from the processing device to the dimming voltage input terminal TACS. The processing device is a host device of the light emission control device 100, and is, for example, a processor such as an MPU or a CPU.

The first control circuit 114 outputs a first control signal SDRV based on the PWM signal DCS. The first control circuit 114 is a logic circuit operated by the power VDL, and is a buffer circuit that buffers, for example, the PWM signal DCS.

The first drive circuit 110 is operated by the power VDR. The first drive circuit 110 outputs a first drive signal DRV for controlling turning on/off of the first switching element 11 based on the first control signal SDRV and a start control signal SDLY. The first drive signal DRV is output from the terminal TDRV and input to a gate of the first switching element 11. When the start control signal SDLY is active, the first drive circuit 110 operates as follows. The first drive circuit 110 outputs the first drive signal DRV for turning on the first switching element 11 when the PWM signal DCS is active, and outputs the first drive signal DRV for turning off the first switching element 11 when the PWM signal DCS is inactive. An operation of the start control circuit 184 that outputs the start control signal SDLY and an operation of the first drive circuit 110 when the start control signal SDLY is inactive will be described later.

The second control circuit 120 is operated by the power VDA, and the second drive circuit 112 is operated by the power VDR. The second control circuit 120 and the second drive circuit 112 perform turning on/off control of the second switching element 12 based on the dimming voltage ACS and the PWM signal DCS.

The second control circuit 120 includes an oscillation circuit 140. The oscillation circuit 140 generates a clock signal CLK. For example, the oscillation circuit 140 is a CR oscillation circuit, a ring oscillator, a multivibrator, or the like.

The second control circuit 120 outputs a second control signal SGTB based on the dimming voltage ACS, the PWM signal DCS, and the clock signal CLK. The second drive circuit 112 outputs a second drive signal GTB based on the second control signal SGTB and the start control signal SDLY. The second drive circuit 112 is, for example, a buffer circuit that buffers the second control signal SGTB. The second drive signal GTB is output from the terminal TGTB and input to a gate of the second switching element 12. After the start control signal SDLY becomes active, the second drive circuit 112 outputs the second drive signal GTB having the same logic level as the second control signal SGTB. An operation of the second drive circuit 112 when the start control signal SDLY is inactive will be described later.

The second control circuit 120 controls turning on/off of the second switching element 12 in a period in which the PWM signal DCS is active. Specifically, a voltage CSP at one end of the first resistor RCS is input to the terminal TCSP, a voltage CSN at the other end of the first resistor RCS is input to the terminal TCSN, and a voltage IS at one end of the second resistor RIS is input to the terminal TIS. The second control circuit 120 performs switching regulation control on the current ILD flowing through the light emission element 15 based on the voltages CSP, CSN, and IS, and the dimming voltage ACS, thereby performing control to be the current ILD corresponding to the dimming voltage ACS.

The second control circuit 120 further includes a control signal output circuit 121, a slope compensation circuit 122, a current detection circuit 123, an error amplifier circuit 124, a switch circuit 125, and a comparator 126. Hereinafter, operations of each portion of the second control circuit 120 and the first drive circuit 110 and the second drive circuit 112 in each dimming mode will be described with reference to waveform diagrams of FIGS. 3 and 4. In the following, the active state is set to a high level and the inactive state is set to a low level.

Figure 3:
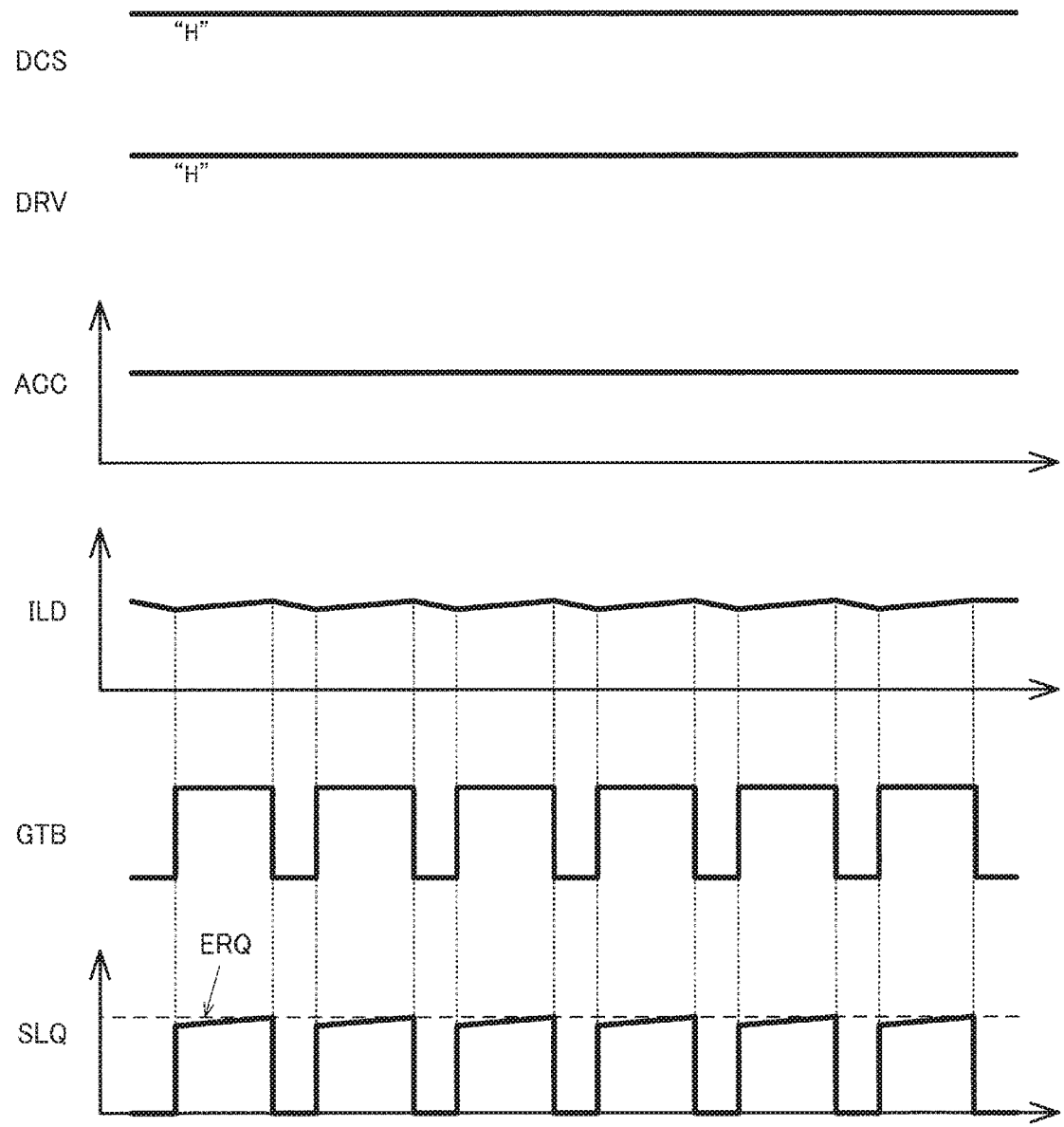
FIG. 3 is a waveform diagram in an analog dimming mode.

FIG. 3 is a waveform diagram in the analog dimming mode. In the analog dimming mode, the PWM signal DCS is at a high level. The first control circuit 114 outputs the first control signal SDRV of a high level, and the first drive circuit 110 outputs a first drive signal DRV of a high level. Therefore, the first switching element 11 is always turned on. In the PWM dimming mode, the PWM signal DCS is a rectangular wave having a high width duty of less than 100%. Therefore, the PWM signal DCS that is always at a high level in the analog dimming mode is a PWM signal having a high width duty of 100%.

The current detection circuit 123 outputs a detection voltage DTQ by multiplying a potential difference CSP−CSN=RCS×ILD across the first resistor RCS by a given gain. The error amplifier circuit 124 amplifies an error between the detection voltage DTQ and the dimming voltage ACS. The switch circuit 125 is turned on when the PWM signal DCS is at a high level, and is turned off when the PWM signal DCS is at a low level. In the analog dimming mode, the switch circuit 125 is always turned on.

The slope compensation circuit 122 increases a slope of the voltage IS over time in order to suppress subharmonic oscillation of the drive current flowing through the laser diode, and outputs a voltage SLQ after the increase in the slope. The comparator 126 compares the voltage SLQ with an output voltage ERQ of the error amplifier circuit 124, outputs a signal CPQ of a low level when SLQ<ERQ, and outputs a signal CPQ of a high level when SLQ>ERQ.

The control signal output circuit 121 allows the second control signal SGTB to transition from a low level to a high level at an edge of the clock signal CLK. When the second control signal SGTB transitions from a low level to a high level, the second drive circuit 112 allows the second drive signal GTB to transition from a low level to a high level.

Since the second switching element 12 is turned on when the second drive signal GTB is at a high level, a current flows from the inductor 14 to the second power node NGN via the second switching element 12 and the second resistor RIS. Since the current flowing through the inductor 14 rises, the voltage IS increases and the output voltage SLQ of the slope compensation circuit 122 rises. Since the current flowing through the inductor 14 flows through the light emission element 15 via the first switching element 11, the current ILD flowing through the light emission element 15 also rises.

When SLQ>ERQ, the output signal CPQ of the comparator 126 transitions from a low level to a high level. In this case, the control signal output circuit 121 allows the second control signal SGTB to transition from a high level to a low level. When the second control signal SGTB transitions from a high level to a low level, the second drive circuit 112 allows the second drive signal GTB to transition from a high level to a low level. When the second drive signal GTB is at a low level, the second switching element 12 is turned off, so that a current flows from the inductor 14 to the first power node NVI via the diode DA. Since the current flowing through the inductor 14 decreases, the current ILD flowing through the light emission element 15 also decreases.

When the detection voltage DTQ that is a detection result of the current ILD is different from the dimming voltage ACS, the output voltage ERQ of the error amplifier circuit 124 changes, so that the duty of the second drive signal GTB changes. Thus, the current ILD is feedback-controlled so that the detection voltage DTQ matches the dimming voltage ACS. Such feedback control keeps the current ILD constant. Control for keeping the current ILD constant is called switching regulation control. The current ILD is maintained at a current value corresponding to the dimming voltage ACS, and when the processing device changes the dimming voltage ACS, the current ILD changes accordingly. That is, in the analog dimming mode, the light emission amount of the light emission element 15 is modulated by the dimming voltage ACS.

The analog dimming mode described above is used from a maximum value of the current ILD to a predetermined value. That is, when the light emission element 15 emits the light with high luminance, the analog dimming mode is used. On the other hand, when the current ILD is less than a predetermined value, that is, when the light emission element 15 emits the light with low luminance, the PWM dimming mode is used.

Figure 4:
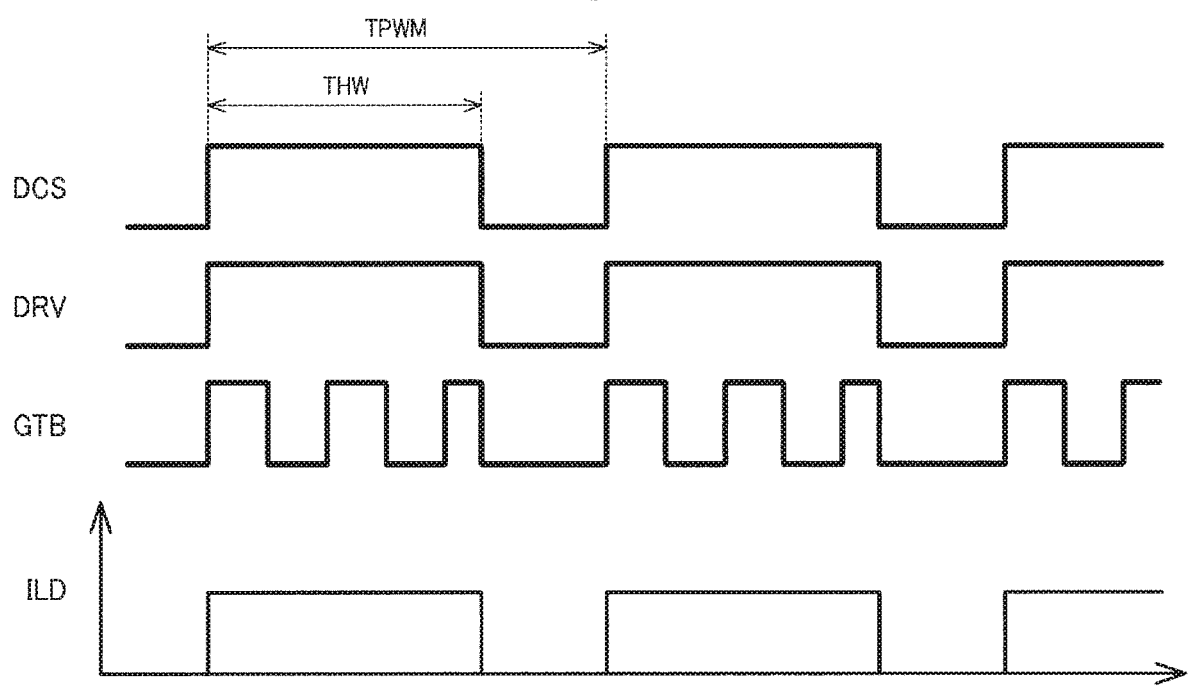
FIG. 4 is a waveform diagram in a PWM dimming mode.

FIG. 4 is a waveform diagram in the PWM dimming mode. A cycle of the PWM signal DCS is TPWM, and a period in which the PWM signal DCS is at a high level is THW. The duty of the PWM signal DCS is (THW/TPWM)×100%. The frequency of the second drive signal GTB is set higher than the frequency of the PWM signal DCS.

When the PWM signal DCS is at a high level, the first control circuit 114 outputs the first control signal SDRV of a high level, and the first drive circuit 110 outputs a first drive signal DRV of a high level. Therefore, the first switching element 11 is turned on. In this case, the second control circuit 120 and the second drive circuit 112 perform the switching regulation control by switching the second switching element 12. Therefore, the current ILD corresponding to the dimming voltage ACS flows through the light emission element 15. When the PWM signal DCS is at a low level, the first control circuit 114 outputs the first control signal SDRV of a low level, and the first drive circuit 110 outputs a first drive signal DRV of a low level. Therefore, the first switching element 11 is turned off. Further, the second control circuit 120 and the second drive circuit 112 turn off the second switching element 12. In this case, no current flows through the light emission element 15.

Since a time average of the current ILD flowing through the light emission element 15 is determined by the duty of the PWM signal DCS, the light emission amount is also determined by the duty of the PWM signal DCS. Thus, in the PWM dimming mode, the dimming control is performed by the duty of the PWM signal DCS. On the other hand, a current value when the current ILD flows through the light emission element 15 is ensured to be higher than the time average. In order to cause the laser diode to oscillate and to emit light, it is necessary for the current ILD of a threshold value or more to flow through the laser diode. By performing the PWM control as described above, it is possible to cause the laser diode to emit light by causing the current ILD of the threshold value or more to flow, and to perform dimming as the time average.

2. Method of Preventing Overcurrent in First Embodiment

Figure 5:
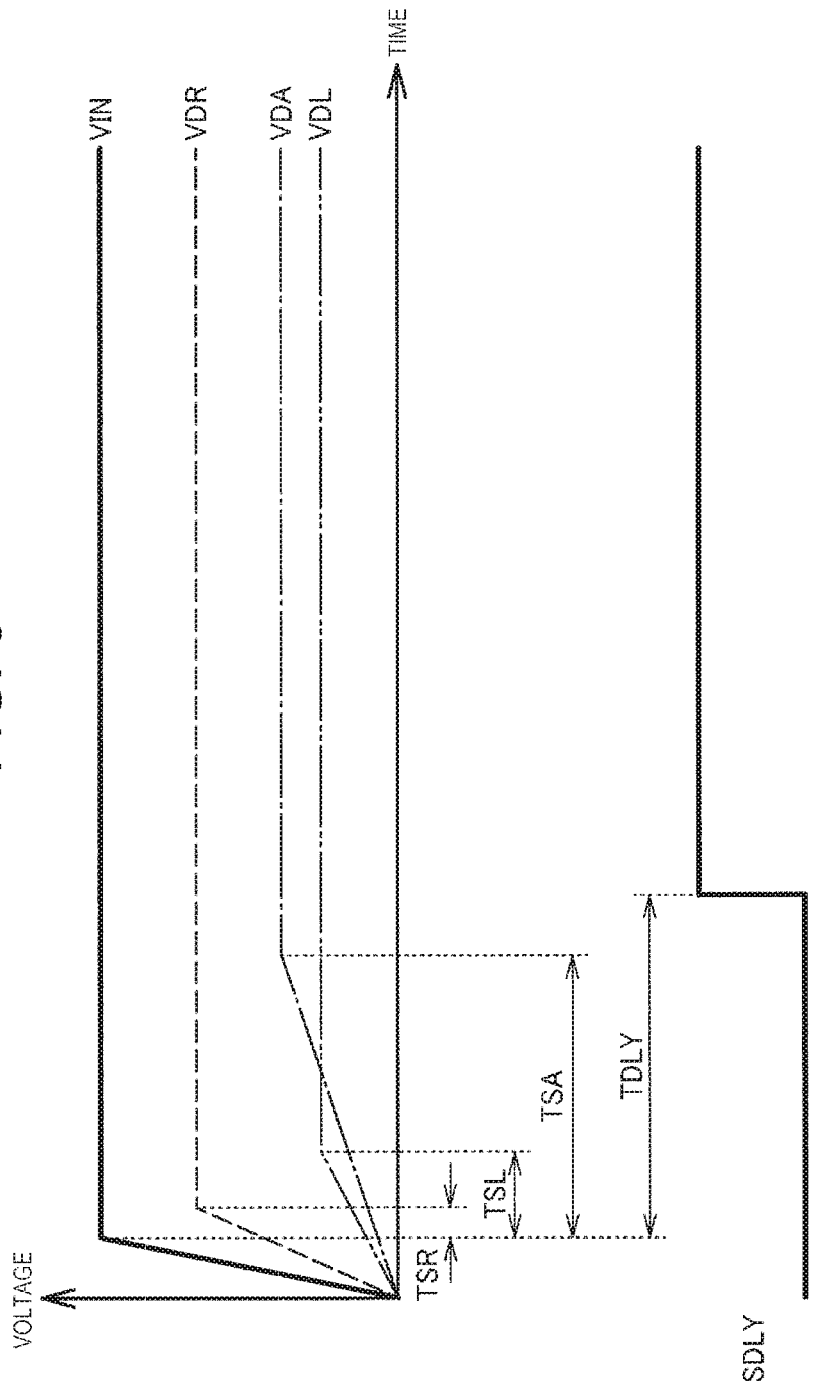
FIG. 5 is a waveform diagram for explaining an operation of a light emission control device.

Next, a method of preventing an overcurrent when the power is turned on will be described. FIG. 5 is a waveform diagram for explaining an operation of the light emission control device 100. First, the overcurrent caused by the rising order of the power will be described, and then a method of preventing the overcurrent in the present embodiment will be described.

As shown in FIG. 5, when the input power VIN is turned on, the voltage of the input power VIN rises. Thereafter, the voltages of the powers VDR, VDL, and VDA generated from the input power VIN rise. In this case, timings at which the voltages of the powers VDR, VDL, and VDA rise are each determined by a load of the power source. In FIG. 5, the voltage of the power VDR to be supplied to the first drive circuit 110 and the second drive circuit 112 initially rises. That is, if periods from a timing at which the voltage of the input power VIN rises to a timing at which the voltages of the powers VDR, VDL, and VDA rise are respectively TSR, TSL, and TSA, TSR<TSL and TSR<TSA. For example, since the first drive circuit 110 and the second drive circuit 112 to which the power VDR is supplied are relatively small circuits such as a buffer, a load on the power source is small. On the other hand, since the second control circuit 120 to which the power VDA is supplied includes a large number of analog circuits such as an amplifier circuit, a load on the power source is large. For this reason, the voltage rise of the power VDA becomes slower than the voltage rise of the power VDR.

The first control signal SDRV is unstable until the voltage of the power VDL rises to a voltage sufficient for the operation of the first control circuit 114. Since the voltage of the power VDR rises earlier than the voltage of the power VDL, there is a period during which the unstable first control signal SDRV is input even though the first drive circuit 110 becomes operable. During this period, the first drive signal DRV is unstable. Thus, a voltage higher than a threshold voltage of the first switching element 11 is input to the gate of the first switching element 11, and therefore the first switching element 11 may be turned on.

Similarly, the second control signal SGTB is unstable until the voltage of the power VDA rises to a voltage sufficient for the operation of the second control circuit 120. Since the voltage of the power VDR rises earlier than the voltage of the power VDA, there is a period during which the unstable second control signal SGTB is input even though the second drive circuit 112 becomes operable. During this period, the second drive signal GTB is unstable. Thus, a voltage higher than a threshold voltage of the second switching element 12 is input to the gate of the second switching element 12, and therefore the second switching element 12 may be turned on.

The on-state of the switching element which is generated when the power is turned on is unintended and is an uncontrolled on-state. When the power is turned on, when the first switching element 11 and the second switching element 12 are turned on, a current flows through the light emission element 15, unintended light emission occurs, or abnormalities occur, for example, an overcurrent equal to or higher than the rating flows through the light emission element 15, or the first switching element 11 generates heat.

Next, a method of preventing the overcurrent will be described. The start control circuit 184 outputs the start control signal SDLY after the input power VIN is turned on. The start control signal SDLY is a signal for delaying a timing at which an output of the drive signal is started. The "drive signal" is the first drive signal DRV or the second drive signal GTB.

As shown in FIG. 5, the start control circuit 184 changes the start control signal SDLY from a low level to a high level after a period TDLY has elapsed since the input power VIN rises. The period TDLY is a delay time for delaying an output start timing of the drive signal, and TDLY>TSA. When the start control signal SDLY is at a low level, at least one of the first drive signal DRV and the second drive signal GTB is set to be inactive.

According to the present embodiment, the start control signal SDLY is set to a high level after the input power VIN is turned on, whereby the output start timing of the drive signal can be delayed. By using the start control signal SDLY, after the voltages of the powers VDA and VDL rise, that is, after the logic levels of the first control signal SDRV and the second control signal SGTB are determined, the output of the drive signal can be started. Thus, at least one of the first switching element 11 and the second switching element 12 is turned off when the power is turned on, thereby preventing the overcurrent when the power is turned on.

Figure 6:
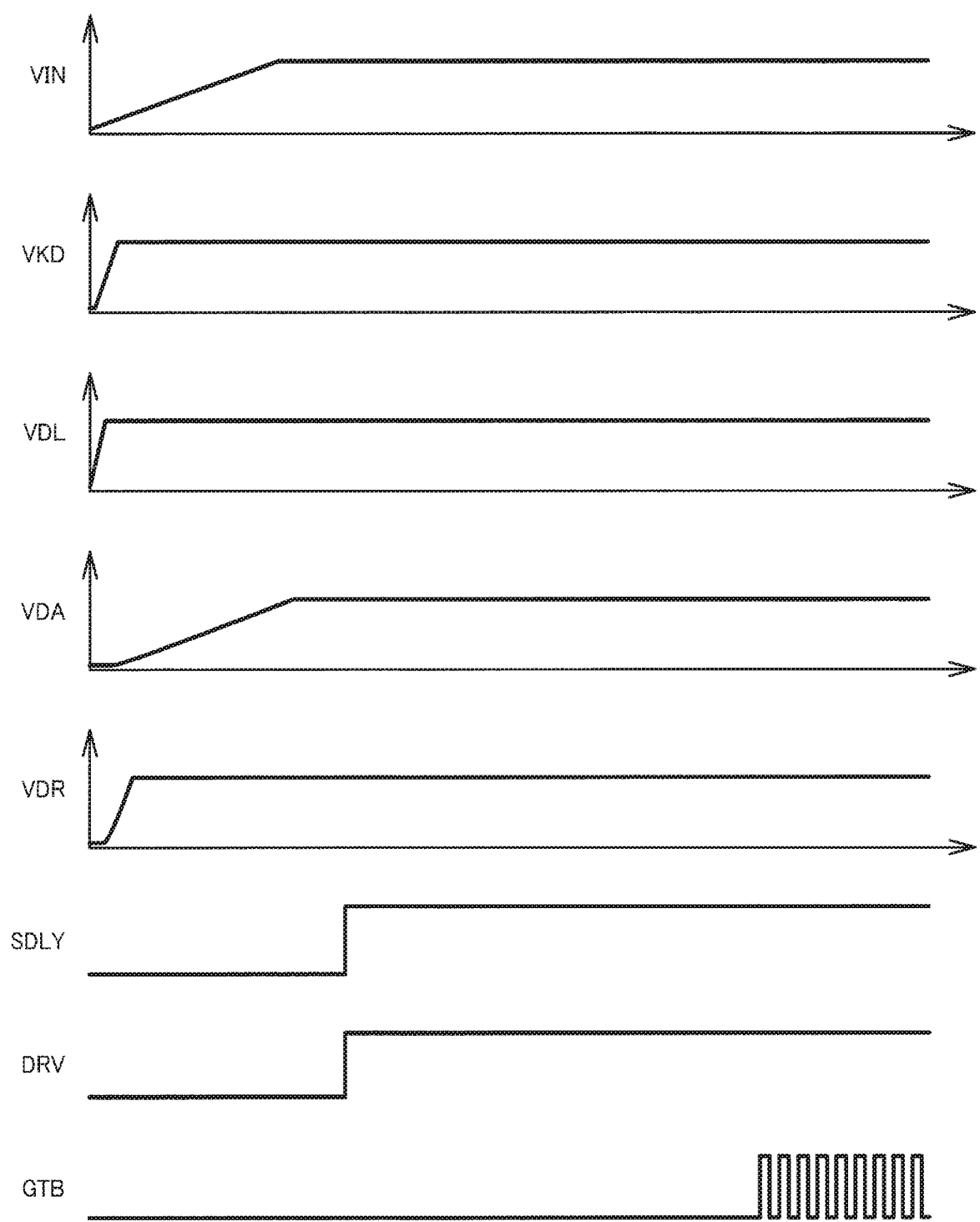
FIG. 6 is a waveform diagram for explaining a method for preventing an overcurrent when a power is turned on in the first embodiment.

The first embodiment of the above-described method will be described with reference to FIGS. 1 and 6. FIG. 6 is a waveform diagram for explaining the first embodiment.

As shown in FIG. 1, the constant voltage circuit 182 converts the voltage of the input power VIN to a constant voltage VKD, and outputs the constant voltage VKD to the start control circuit 184. The start control circuit 184 operates the constant voltage VKD as a power source voltage, and outputs the start control signal SDLY to the first drive circuit 110 and the second drive circuit 112.

As shown in FIG. 6, the first drive circuit 110 delays a timing at which an output of the first drive signal DRV is started based on the start control signal SDLY. Specifically, the first drive circuit 110 maintains the first drive signal DRV at a low level when the start control signal SDLY is at a low level, and passes the first control signal SDRV when the start control signal SDLY is at a high level. In FIG. 6, SDRV and DCS are set to a high level. In addition, the second drive circuit 112 delays a timing at which an output of the second drive signal GTB is started based on the start control signal SDLY. Specifically, the second drive circuit 112 maintains the second drive signal GTB at a low level when the start control signal SDLY is at a low level, and passes the second control signal SGTB after the start control signal SDLY becomes a high level.

Further, as shown in FIG. 6, the constant voltage VKD rises earlier than the voltage increase of the power VDR. That is, the first drive signal DRV and the second drive signal GTB may become unstable due to the rise of the power VDR, but the start control circuit 184 can determine a logic level of the start control signal SDLY earlier than that of the first drive signal DRV and the second drive signal GTB. Therefore, the first drive signal DRV and the second drive signal GTB can be reliably set to a low level until the start control signal SDLY becomes a high level after the power VDR rises.

In the above embodiment, a case where the first drive signal DRV and the second drive signal GTB become a low level when the start control signal SDLY is at a low level has been described. However, the present disclosure is not limited thereto, and it is only necessary that the first drive signal DRV or the second drive signal GTB is at a low level when the start control signal SDLY is at a low level. At least one of the first switching element 11 and the second switching element 12 is turned off, thereby preventing the overcurrent when the power is turned on.

Figure 7:
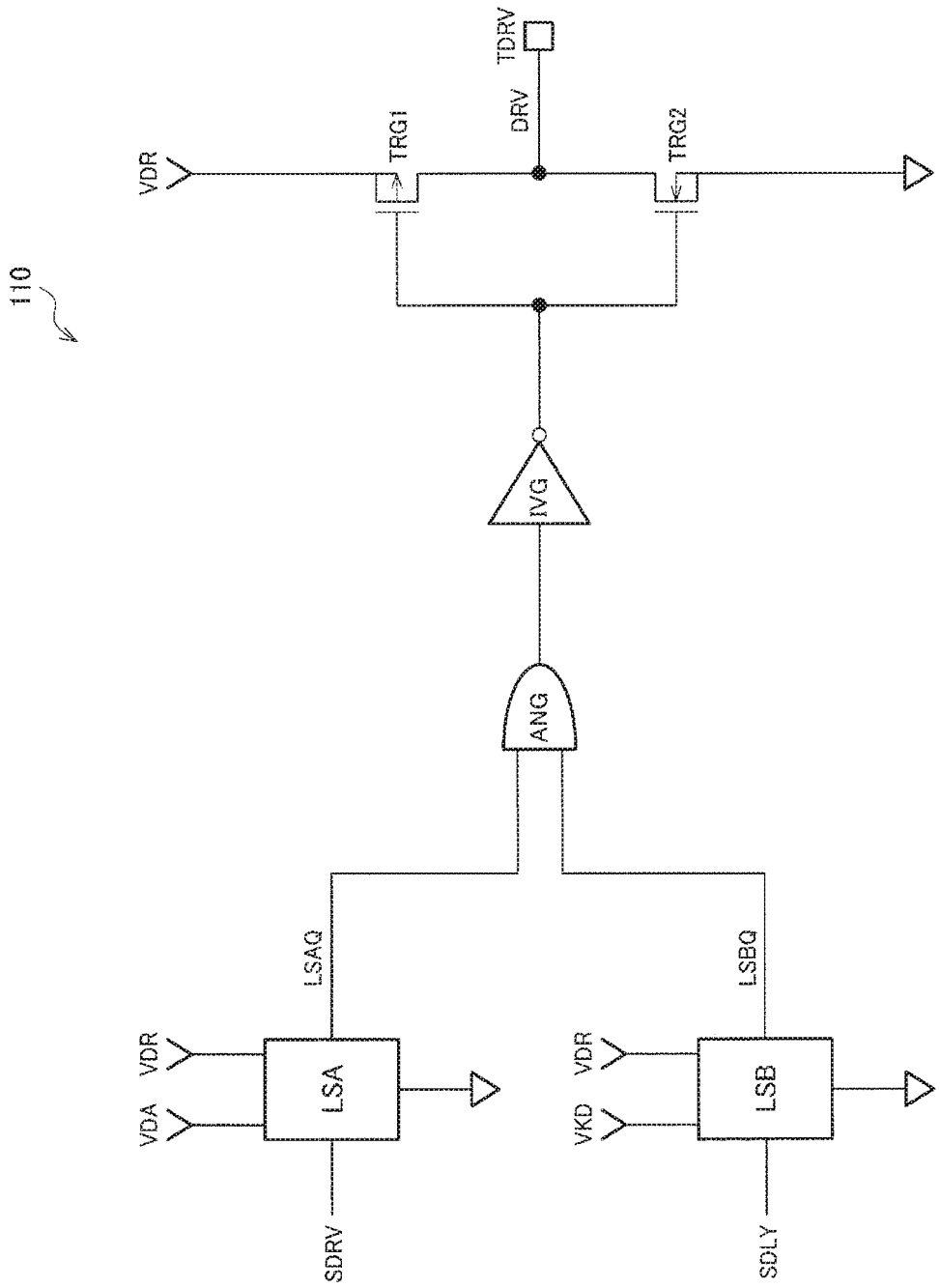
FIG. 7 is a detailed configuration example of a first drive circuit.

FIG. 7 is a detailed configuration example of the first drive circuit 110. The first drive circuit 110 includes a P-type transistor TRG1, an N-type transistor TRG2, a buffer circuit IVG, a logic circuit ANG, and level shifters LSA and LSB.

A source of the P-type transistor TRG1 is coupled to a power node for a drive circuit to which the power VDR for a drive circuit is supplied, and a drain of the P-type transistor TRG1 is coupled to a drive signal output node that outputs the first drive signal DRV. A source of the N-type transistor TRG2 is coupled to a ground node, and a drain of the N-type transistor TRG2 is coupled to the drive signal output node.

The level shifter LSA level-shifts the first control signal SDRV from the voltage of the power VDA to the voltage of the power VDR, and outputs a signal LSAQ after the level-shift. The level shifter LSB level-shifts the start control signal SDLY from the constant voltage VKD to the voltage of the power VDR, and outputs a signal LSBQ after the level-shift.

The logic circuit ANG is an AND circuit. The logic circuit ANG outputs a logical product of the signal LSAQ and the signal LSBQ. The buffer circuit IVG is an inverter. The buffer circuit IVG drives the P-type transistor TRG1 and the N-type transistor TRG2 based on an output signal of the logic circuit ANG.

When the start control signal SDLY is at a low level, the logic circuit ANG outputs a low level, and thus the P-type transistor TRG1 is turned off and the N-type transistor TRG2 is turned on. Therefore, the first drive signal DRV at a low level is output, and the first switching element 11 is turned off. When the start control signal SDLY is at a high level, the logic circuit ANG outputs the same logic level as that of the first control signal SDRV. Thus, the first drive signal DRV having the same logic level as that of the first control signal SDRV is output, and the first switching element 11 is turned on or off based on the first control signal SDRV.

3. Second Embodiment

Figure 8:
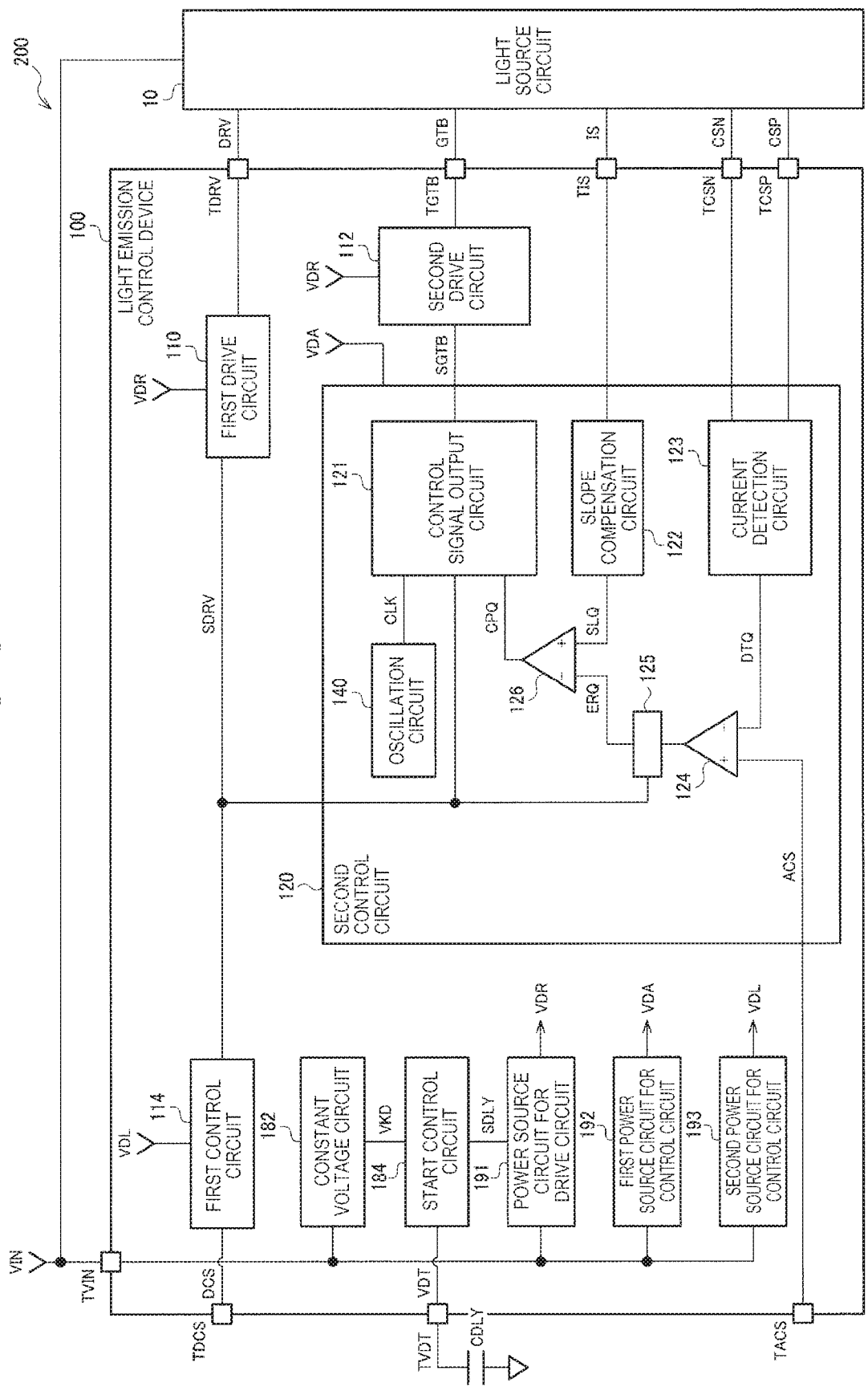
FIG. 8 is a configuration example of a light emission control device in a second embodiment.
Figure 9:
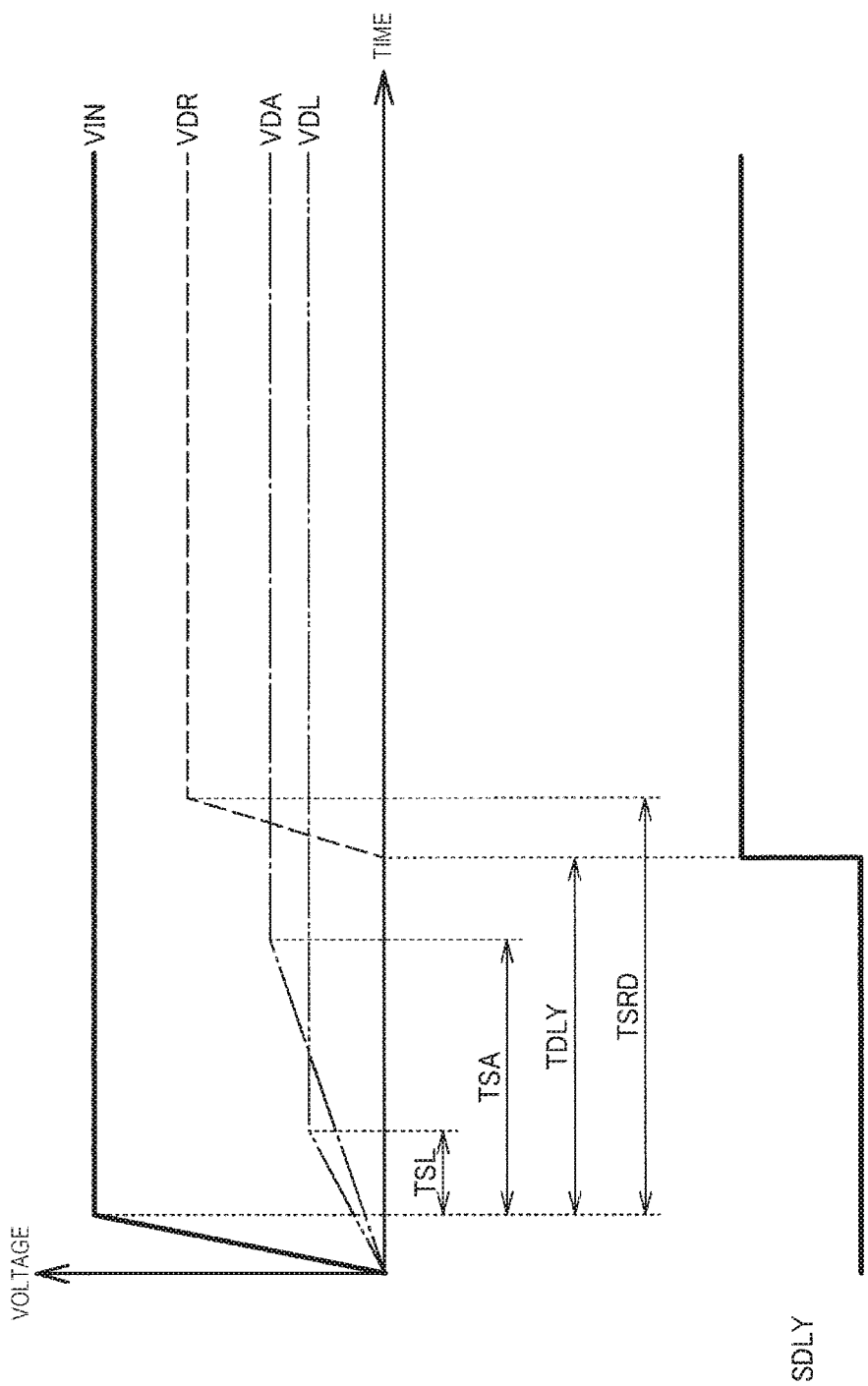
FIG. 9 is a waveform diagram for explaining an operation of the light emission control device in the second embodiment.

FIG. 8 is a configuration example of the light emission control device 100 in a second embodiment. The configuration of the light source circuit 10 is as described in FIG. 2. FIG. 9 is a waveform diagram for explaining an operation of the light emission control device 100 in the second embodiment. The components already described are denoted by the same reference numerals, and description thereof is appropriately omitted.

As shown in FIG. 8, in the second embodiment, the start control circuit 184 outputs the start control signal SDLY to the power source circuit 191 for a drive circuit. As shown in FIG. 9, the power source circuit 191 for a drive circuit delays, based on the start control signal SDLY, a timing at which a supply of the power VDR for a drive circuit is started after the input power VIN is turned on.

Specifically, when the start control signal SDLY is at a low level, the power source circuit 191 for a drive circuit does not supply the power VDR for a drive circuit to the first drive circuit 110 and the second drive circuit 112. That is, when the start control signal SDLY is at a low level, the power source circuit 191 for a drive circuit does not convert the voltage of the input power VIN to the voltage of the power VDR for a drive circuit. When the start control signal SDLY changed from a low level to a high level, the power source circuit 191 for a drive circuit starts the supply of the power VDR for a drive circuit by starting the above voltage conversion.

A period from a timing at which the voltage of the input power VIN rises to a timing at which the voltage of the power VDR rises is TSRD. Since TDLY>TSL and TDLY>TSA as described in FIG. 5, TSRD>TSL and TSRD>TSA. That is, the voltage of the power VDR finally rises among the powers VDR, VDL, and VDA. Therefore, after the voltages of the powers VDA and VDL rise, that is, after the logic levels of the first control signal SDRV and the second control signal SGTB are determined, the power VDR is supplied to the first drive circuit 110 and the second drive circuit 112. As a result, the first switching element 11 and the second switching element 12 are turned off when the power is turned on, thereby preventing the overcurrent when the power is turned on.

Figure 10:
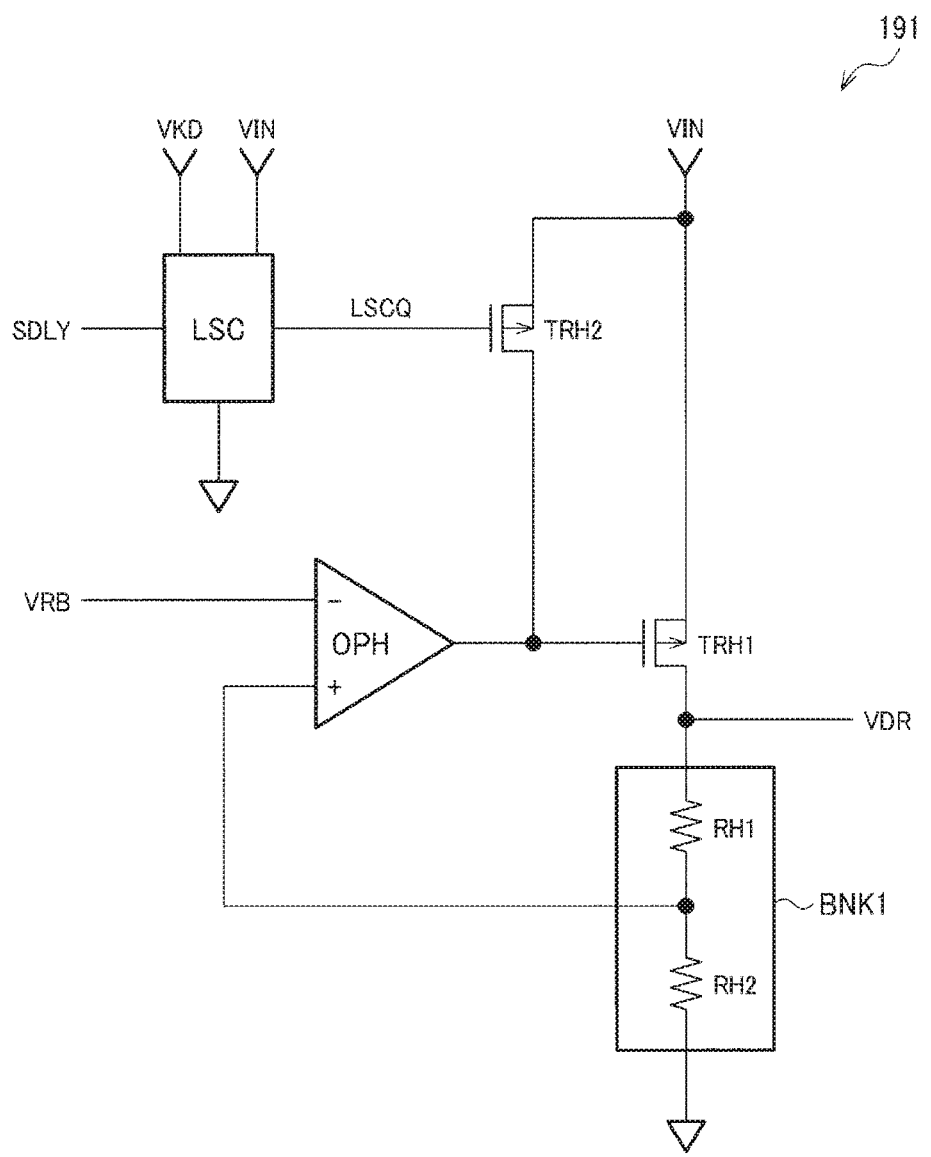
FIG. 10 shows a detailed configuration example of a power source circuit for a drive circuit.

FIG. 10 shows a detailed configuration example of the power source circuit 191 for a drive circuit. The power source circuit 191 for a drive circuit includes a first transistor TRH1, a second transistor TRH2, a first voltage dividing circuit BNK1, an operational amplifier OPH, and a level shifter LSC. The first transistor TRH1 and the second transistor TRH2 are P-type transistors.

A source of the first transistor TRH1 is coupled to an input power node, and a drain of the first transistor TRH1 is coupled to a power node for a drive circuit that supplies a power VDR for a drive circuit. The input power node is a node coupled to the power terminal TVIN, and is a node to which the input power VIN is supplied from the power terminal TVIN.

One end of the first voltage dividing circuit BNK1 is coupled to the power node for a drive circuit, and the other end of the first voltage dividing circuit BNK1 is coupled to the ground node. The first voltage dividing circuit BNK1 includes resistors RH1 and RH2 coupled in series between the power node for a drive circuit and the ground node. The first voltage dividing circuit BNK1 outputs the voltage divided by the resistors RH1 and RH2 to a first input node of the operational amplifier OPH. The first input node is a positive input node.

A first reference voltage VRB is input to a second input node of the operational amplifier OPH. The second input node is a negative input node. The operational amplifier OPH outputs an output voltage to a gate of the first transistor TRH1.

The operational amplifier OPH, the first transistor TRH1, and the first voltage dividing circuit BNK1 constitute a regulator. The regulator converts the voltage of the input power VIN to the voltage of the power VDR for a drive circuit.

A source of the second transistor TRH2 is coupled to the input power node, and a drain of the second transistor TRH2 is coupled to the gate of the first transistor TRH1.

The level shifter LSC level-shifts the start control signal SDLY from the voltage of the power VDA to the voltage of the input power VIN, and outputs the signal LSCQ after the level-shift to a gate of the second transistor TRH2.

When the start control signal SDLY is at a low level, the second transistor TRH2 is turned on, and thus the gate-source voltage of the first transistor TRH1 becomes zero. Therefore, the first transistor TRH1 is turned off, so that the power VDR for a drive circuit is set to the ground voltage via the first voltage dividing circuit BNK1. When the start control signal SDLY is at a high level, the second transistor TRH2 is turned off, so that the regulator starts operation and supplies the power VDR for a drive circuit.

4. Start Control Circuit and Constant Voltage Circuit

Figure 11:
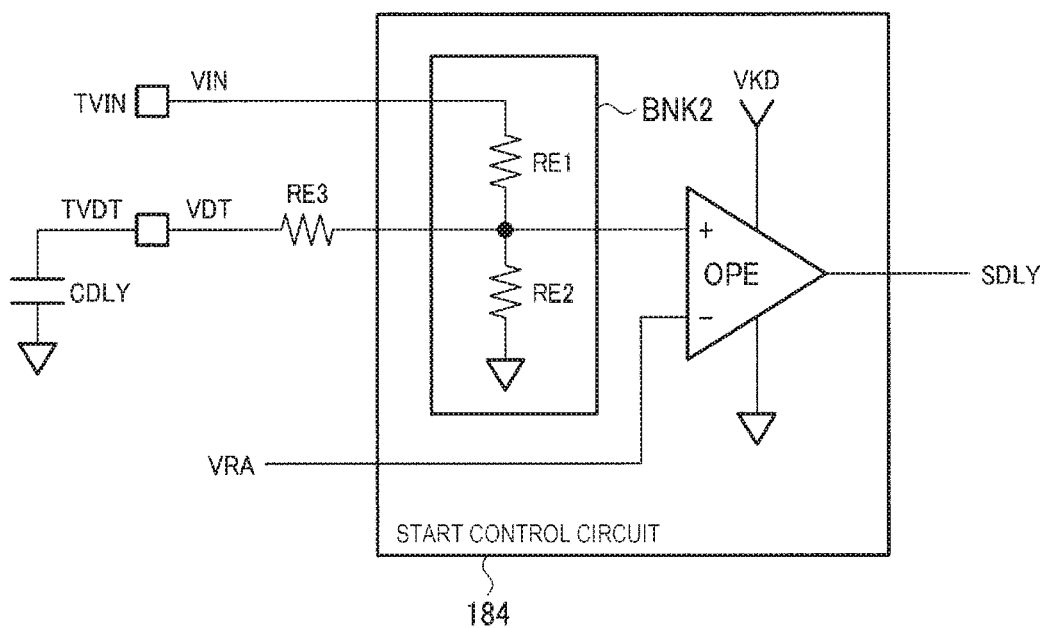
FIG. 11 is a detailed configuration example of a start control circuit.

FIG. 11 is a detailed configuration example of the start control circuit 184. The configuration of FIG. 11 can be applied to both of the first and second embodiments. The start control circuit 184 includes a second voltage dividing circuit BNK2 and a comparator OPE.

One end of the second voltage dividing circuit BNK2 is coupled to the input power node that is coupled to the power terminal TVIN, and the other end of the second voltage dividing circuit BNK2 is coupled to the ground node. The second voltage dividing circuit BNK2 includes resistors RE1 and RE2 coupled in series between the input power node and the ground node. One end of a resistor RE3 for electrostatic protection is coupled to a node between the resistors RE1 and RE2. The other end of the resistor RE3 is coupled to the capacitor terminal TVDT. An external capacitor CDLY that is an external part of the light emission control device 100 is coupled to the capacitor terminal TVDT.

The comparator OPE operates using the constant voltage VKD as a power source voltage. A voltage VDT of the capacitor terminal TVDT is input to the positive input node of the comparator OPE, and a second reference voltage VRA is input to the negative input node of the comparator OPE. The comparator OPE compares the voltage VDT with the second reference voltage VRA, and outputs the start control signal SDLY which is a result of the comparison.

The resistors RE1 to RE3 and the external capacitor CDLY are low pass filters, and the voltage VDT which is a divided voltage from the second voltage dividing circuit BNK2 is obtained by smoothing the voltage of the input power VIN by the low pass filter. When the input power VIN is turned on, the voltage of the input power VIN rises, and also the voltage VDT rises with a delay. When the voltage VDT reaches the second reference voltage VRA, the comparator OPE changes the start control signal SDLY from a low level to a high level. That is, the start control signal SDLY transitions from a low level to a high level with a delay from the timing when the input power VIN is turned on. The delay time can be set by resistance values of the resistors RE1 and RE2 of the second voltage dividing circuit BNK2 and a capacitance value of the external capacitor CDLY.

Figure 12:
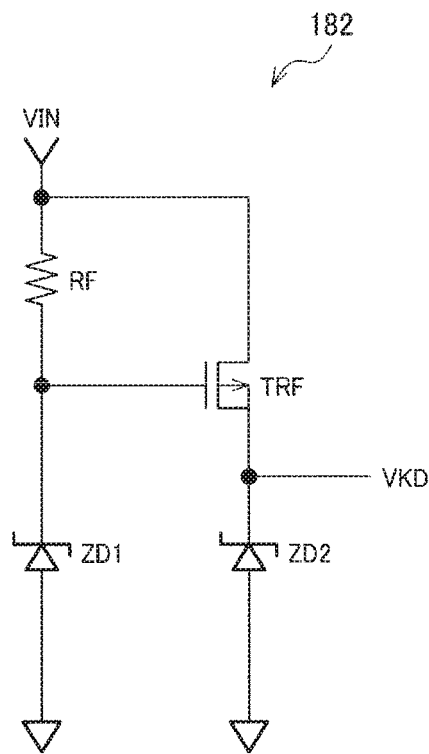
FIG. 12 is a detailed configuration example of a constant voltage circuit.

FIG. 12 is a detailed configuration example of the constant voltage circuit 182. The configuration of FIG. 12 can be applied to both of the first and second embodiments. The constant voltage circuit 182 includes Zener diodes ZD1 and ZD2, a resistor RF, and an N-type transistor TRF.

The Zener diode ZD1 is provided between the input power node and the ground node. Specifically, an anode of the Zener diode ZD1 is coupled to the ground node, a cathode of the Zener diode ZD1 is coupled to one end of the resistor RF, and the other end of the resistor RF is coupled to the input power node.

A source of the N-type transistor TRF is coupled to an output node of the constant voltage circuit 182, and a drain of the N-type transistor TRF is coupled to the input power node. A Zener voltage of the Zener diode ZD1 is input to a gate of the N-type transistor TRF. The constant voltage VKD that is a source voltage of the N-type transistor TRF is lower than the Zener voltage of the Zener diode ZD1 by a threshold voltage of the N-type transistor TRF.

The Zener diode ZD2 is provided as a protection element. That is, a Zener voltage of the Zener diode ZD2 is higher than the constant voltage VKD.

As described above, the constant voltage circuit 182 outputs the constant voltage VKD based on the Zener voltage of the Zener diode ZD1. The Zener diode ZD1 can cause the constant voltage VKD to be generated at a higher speed than a regulator or the like which generates a voltage by feedback. That is, after the input power VIN is turned on, the constant voltage VKD can be raised earlier than that of the powers VDR, VDL, and VDA.

5. Projection-Type Video Display Apparatus

Figure 13:
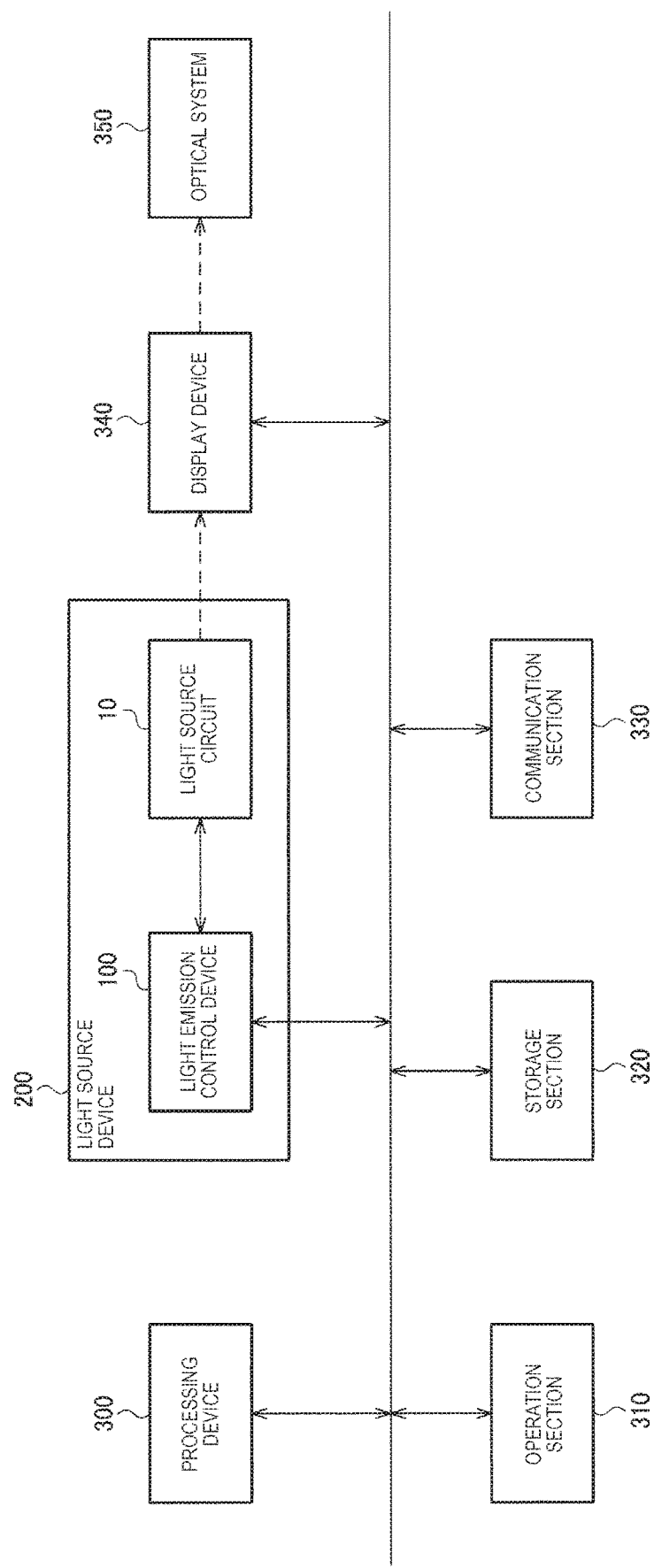
FIG. 13 is a configuration example of a projection-type video display apparatus.

FIG. 13 is a configuration example of a projection-type video display apparatus 400 including the light source device 200. The projection-type video display apparatus 400 is an apparatus that projects a video on a screen, and is also called a projector. The projection-type video display apparatus 400 includes the light source device 200, a processing device 300, an operation section 310, a storage section 320, a communication section 330, a display device 340, and an optical system 350. The light source device 200 includes the light emission control device 100 and the light source circuit 10.

The communication section 330 performs communication with an information processing device such as a PC. The communication section 330 is various video interfaces such as a VGA standard, a DVI standard, and an HDMI (HDMI is a registered trademark) standard. Alternatively, the communication section 330 may be a communication interface such as a USB standard or a network interface such as a LAN. The storage section 320 stores the image data input from the communication section 330. The storage section 320 may function as a working memory for the processing device 300. The storage section 320 is various storage devices such as a semiconductor memory or a hard disk drive. The operation section 310 is a user interface for the user to operate the projection-type video display apparatus 400. For example, the operation section 310 is a button, a touch panel, a pointing device, a character input device, or the like. The processing device 300 is a processor such as a CPU or a MPU. The processing device 300 transmits the image data stored in the storage section 320 to the display device 340. In addition, the processing device 300 performs dimming control by outputting a PWM signal and a dimming voltage to the light emission control device 100. The display device 340 includes a liquid crystal display panel and a display driver that displays an image on the liquid crystal display panel based on the image data. Light enters the liquid crystal panel from the light source circuit 10, and the light transmitted through the liquid crystal panel is projected onto a screen by the optical system 350. In FIG. 13, a light path is indicated by dotted arrows.

The light emission control device of the present embodiment described above controls the switching element of the light source circuit. The light source circuit includes the resistor, the light emission element, the switching element, and the inductor provided in series between the first power node and the second power node. The light emission control device includes the power source circuit for a drive circuit that supplies the power for a drive circuit based on the input power, the power source circuit for a control circuit that supplies the power for a control circuit based on the input power, the control circuit operated by the power for a control circuit, the drive circuit operated by the power for a drive circuit, and the start control circuit. The control circuit outputs the control signal for controlling turning on/off of the switching element. The drive circuit outputs the drive signal for driving the switching element based on the control signal. The start control circuit outputs the start control signal for delaying a timing at which the output of the drive signal is started after the input power is turned on.

In this way, the start control signal is output after the input power is turned on, whereby the output start timing of the drive signal can be delayed. By using the start control signal, after the voltage of the power for a control circuit rises, that is, after the logic level of the control signal is determined, the output of the drive signal can be started. Thus, the switching element is turned off when the power is turned on, thereby interrupting the current flowing through the light emission element. As a result, the overcurrent when the power is turned on can be prevented.

In the present embodiment, the switching element, the power for a control circuit, the power source circuit for a control circuit, the control signal, the control circuit, the drive signal, and the drive circuit are, for example, the first switching element, the first power for a control circuit, the first power source circuit for a control circuit, the first control signal, the first control circuit, the first drive signal, and the first drive circuit, or the second switching element, the second power for a control circuit, the second power source circuit for a control circuit, the second control signal, the second control circuit, the second drive signal, and the second drive circuit, respectively.

In the present embodiment, the start control circuit may output the start control signal to the drive circuit. The drive circuit may delay, based on the start control signal, the timing at which the output of the drive signal is started.

In this way, the drive circuit can delay the timing at which the output of the drive signal is started, based on the start control signal output by the start control circuit.

In the present embodiment, the drive circuit may include the P-type transistor, the N-type transistor, the buffer circuit, and the logic circuit. The P-type transistor may be provided between the power node for a drive circuit to which the power for a drive circuit is supplied and the drive signal output node that outputs the drive signal. The N-type transistor may be provided between the drive signal output node and the ground node. The buffer circuit may drive the P-type transistor and the N-type transistor. The logic circuit may output an inactive output signal to the buffer circuit when the start control signal is inactive, and output the control signal to the buffer circuit when the start control signal is active.

In this way, when the start control signal changes from an inactive state to an active state, the output signal of the logic circuit changes from the inactive state to the control signal. Therefore, the drive signal changes from the inactive state to the control signal, that is, the output of the drive signal is started. Thus, after the input power is turned on, the output of the drive signal is started with a delay.

In the present embodiment, the start control circuit may output the start control signal to the power source circuit for a drive circuit. The power source circuit for a drive circuit may delay, based on the start control signal, the timing at which the supply of the power for a drive circuit is started after the input power is turned on.

In this way, the timing at which the supply of the power for a drive circuit is started after the input power is turned on is delayed. Since the drive circuit is operated by the power for a drive circuit, the timing at which the output of the drive signal is started is delayed by delaying the timing at which the supply of the power for a drive circuit is started.

In the present embodiment, the light emission control device may include the power terminal which is coupled to the first power node and to which the input power is supplied. The power source circuit for a drive circuit may include the first transistor, the first voltage dividing circuit, the operational amplifier, and the second transistor. The first transistor may be provided between the input power node that is coupled to the power terminal and the power node for a drive circuit that supplies the power for a drive circuit. The first voltage dividing circuit may be provided between the power node for a drive circuit and a ground node. The operational amplifier may include the first input node to which the divided voltage from the first voltage dividing circuit is input and the second input node to which the first reference voltage is input, and output the output voltage to the gate of the first transistor. The second transistor may be provided between the input power node and the output node of the operational amplifier. The start control circuit may output the start control signal to the gate of the second transistor.

In this way, when the second transistor is turned on by the start control signal, the gate-source voltage of the first transistor becomes zero, and thus the first transistor is turned off. Therefore, the power for a drive circuit is set to the ground voltage via the first voltage dividing circuit. On the other hand, when the second transistor is turned off by the start control signal, the first transistor, the first voltage dividing circuit, and the operational amplifier function as regulators. The regulator supplies the power for a drive circuit. As described above, the timing at which the supply of the power for a drive circuit is started after the input power is turned on is delayed based on the start control signal.

In the present embodiment, the light emission control device may include the power terminal which is coupled to the first power node and to which the input power is supplied. The start control circuit may include the second voltage dividing circuit and the comparator. The second voltage dividing circuit may be provided between the input power node that is coupled to the power terminal and the ground node. The comparator may change the start control signal from the inactive state to the active state when the divided voltage from the second voltage dividing circuit reaches the second reference voltage.

According to the present embodiment, the divided voltage is output by dividing the input power by the second voltage dividing circuit. That is, after the input power is turned on, the divided voltage rises. When the divided voltage reaches the second reference voltage, the start control signal changes from the inactive state to the active state. Thus, after the input power is turned on, the start control signal changes from the inactive state to the active state. By using such a start control signal, the timing at which the output of the drive signal is started can be delayed.

In the present embodiment, the light emission control device may include the capacitor coupling terminal that is coupled to the output node of the second voltage dividing circuit and to which the external capacitor is coupled.

In this way, the second voltage dividing circuit and the external capacitor constitute the low pass filter. The divided voltage from the second voltage dividing circuit is obtained by smoothing the voltage of the input power by the low pass filter. When the input power is turned on, the voltage of the input power rises, and also the divided voltage rises with a delay. Thus, the start control signal transitions from the inactive state to the active state with a delay from the timing when the input power is turned on.

In the present embodiment, the light emission control device may include the constant voltage circuit which outputs the constant voltage based on the input power. The start control circuit may be operated by the constant voltage.

In this way, the start control circuit can be operated by the constant voltage different from the voltage of the power for a drive circuit. Therefore, after the input power is turned on, the logic level of the start control signal can be determined before the unstable drive signal is output. As a result, the drive signal can reliably be inactive when the power is turned on.

In the present embodiment, the light emission control device may include the power terminal which is coupled to the first power node and to which the input power is supplied. The constant voltage circuit may include the Zener diode provided between the input power node that is coupled to the power terminal and the ground node. The constant voltage circuit may output the constant voltage based on the Zener voltage of the Zener diode.

According to the present embodiment, the Zener diode can cause the constant voltage to be generated at a higher speed than the regulator or the like which generates a voltage by feedback. That is, after the input power is turned on, the constant voltage can be raised earlier than the voltage of the power for a drive circuit.

In the present embodiment, the drive circuit may include the level shifter that level-shifts, from the constant voltage to the voltage of the power for a drive circuit, the start control signal output from the start control circuit.

The start control circuit is operated by the constant voltage, and the drive circuit is operated by the power for a drive circuit. The level shifter level-shifts the start control signal from the constant voltage to the voltage of the power for a drive circuit, and thus the start control signal can be input to the drive circuit from the start control circuit.

The light source device according to the present embodiment includes the light emission control device described in any of the above and the light source circuit.

The projection-type video display apparatus according to the present embodiment includes the light source device described in any of the above and the processing device that controls the light source device.

Although the present embodiments have been described in detail above, it will be easily understood by those skilled in the art that many modified examples can be made without departing from the novel matters and effects of the present disclosure. Accordingly, all such modified examples are intended to be included within the scope of the present disclosure. For example, a term described at least once together with a different term having a broader meaning or the same meaning in the specification or the drawings can be replaced with a different term anywhere in the specification or the drawings. All combinations of the present embodiment and the modified examples are also included in the scope of the present disclosure. Further, the configurations and operations of the light emission control circuit, the light emission control device, the light source circuit, the light source device, and the projection-type video display apparatus are not limited to those described in the present embodiments, and various modifications can be made.

What is claimed is:

1. A light emission control device for controlling a switching element of a light source circuit, the light source circuit including a resistor, a light emission element, the switching element, and an inductor provided in series between a first power node and a second power node, the device comprising:
 a first power supply circuit that supplies a first power supply voltage based on an input power;
 a second power supply circuit that supplies a second power supply voltage based on the input power;
 a control circuit that is operated by the second power supply voltage and outputs a control signal for controlling turning on/off of the switching element;
 a drive circuit that is operated by the first power supply voltage and outputs a drive signal for driving the switching element based on the control signal; and
 a start control circuit, wherein
 the start control circuit outputs a start control signal for delaying a timing at which an output of the drive signal is started after the input power is turned on.

2. The light emission control device according to claim 1, wherein
 the start control circuit outputs the start control signal to the drive circuit; and
 the drive circuit delays, based on the start control signal, the timing at which the output of the drive signal is started.

3. The light emission control device according to claim 2, wherein
 the drive circuit includes
  a P-type transistor provided between a drive circuit power node to which the first power voltage is supplied and a drive signal output node that outputs the drive signal,
  an N-type transistor provided between the drive signal output node and a ground node,
  a buffer circuit that drives the P-type transistor and the N-type transistor, and
  a logic circuit that outputs an inactive output signal to the buffer circuit when the start control signal is inactive, and outputs the control signal to the buffer circuit when the start control signal is active.

4. The light emission control device according to claim 1, wherein
 the start control circuit outputs the start control signal to the first power supply circuit, and
 the first power supply circuit delays, based on the start control signal, a timing at which the supply of the first power supply voltage is started after the input power is turned on.

5. The light emission control device according to claim 4, further comprising:
 a power terminal that is coupled to the first power node and to which the input power is supplied, wherein
 the first power supply circuit includes a first transistor provided between an input power node that is coupled to the power terminal and a drive circuit power node that supplies the first power supply voltage, a first voltage dividing circuit provided between the drive circuit power node and a ground node, an operational amplifier that includes a first input node to which a divided voltage from the first voltage dividing circuit is input and a second input node to which a first reference voltage is input, and that outputs an output voltage to a gate of the first transistor, and a second transistor provided between the input power node and an output node of the operational amplifier, and the start control circuit outputs the start control signal to a gate of the second transistor.

6. The light emission control device according to claim 1, further comprising:

a power terminal that is coupled to the first power node and to which the input power is supplied, wherein the start control circuit includes a second voltage dividing circuit provided between the input power node that is coupled to the power terminal and a ground node, and a comparator changing the start control signal from an inactive state to an active state when a divided voltage from the second voltage dividing circuit reaches a second reference voltage.

7. The light emission control device according to claim 6, further comprising:

a capacitor coupling terminal that is coupled to an output node of the second voltage dividing circuit and to which an external capacitor is coupled.

8. The light emission control device according to claim 1, further comprising:

a constant voltage circuit outputting a constant voltage based on the input power, wherein the start control circuit is operated by the constant voltage.

9. The light emission control device according to claim 8, further comprising:

a power terminal that is coupled to the first power node and to which the input power is supplied, wherein the constant voltage circuit includes a Zener diode provided between an input power node that is coupled to the power terminal and a ground node, and outputs the constant voltage based on a Zener voltage of the Zener diode.

10. The light emission control device according to claim 8, wherein the drive circuit includes a level shifter that level-shifts, from the constant voltage to the first power supply voltage, the start control signal output from the start control circuit.

11. A light source device comprising:

the light emission control device according to claim 1; and the light source circuit.

12. A projection-type video display apparatus comprising:

the light source device according to claim 11; and a processing device controlling the light source device.

* * * * *